(12) United States Patent
Zhang et al.

(10) Patent No.: US 9,461,928 B2
(45) Date of Patent: Oct. 4, 2016

(54) LACP NEGOTIATION PROCESSING METHOD, RELAY NODE, AND SYSTEM

(71) Applicant: Huawei Technologies Co., Ltd., Shenzhen (CN)

(72) Inventors: Yinxi Zhang, Nanjing (CN); Guangzheng Zhou, Nanjing (CN); Xiaoqin Xue, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 184 days.

(21) Appl. No.: 14/489,754

(22) Filed: Sep. 18, 2014

(65) Prior Publication Data

US 2015/0003464 A1    Jan. 1, 2015

Related U.S. Application Data

(63) Continuation of application No. PCT/CN2012/084270, filed on Nov. 8, 2012.

(30) Foreign Application Priority Data

Apr. 12, 2012  (CN) .......................... 2012 1 0106745

(51) Int. Cl.
*H04L 12/891* (2013.01)
*H04L 12/709* (2013.01)
(Continued)

(52) U.S. Cl.
CPC ............ *H04L 47/41* (2013.01); *H04L 41/083* (2013.01); *H04L 41/0836* (2013.01); *H04L 45/245* (2013.01); *H04L 47/125* (2013.01); *Y02B 60/33* (2013.01)

(58) Field of Classification Search
None
See application file for complete search history.

(56) References Cited

U.S. PATENT DOCUMENTS 6,631,141 B1 * 10/2003 Kumar .................... H04L 45/00
370/235
8,059,638 B2    11/2011 Nam et al.
(Continued)

FOREIGN PATENT DOCUMENTS

CN          1553628 A       12/2004
CN        101815006 A        8/2010
(Continued)

OTHER PUBLICATIONS

Foreign Communication From a Counterpart Application, European Application No. 12874189.9 Extended European Search Report dated May 7, 2015, 9 pages.
(Continued)

*Primary Examiner* — Hicham Foud
(74) *Attorney, Agent, or Firm* — Conley Rose, P.C.; Grant Rodolph (57) ABSTRACT

A LACP negotiation processing method is implemented by relay node that is located between a first node and a second node. A relay node receives a LACP packet sent by the first node and a LACP packet sent by the second node. The relay node determines first link information between the relay node and a first node according to the LACP packet sent by the first node, and determines second link information between the relay node and a second node according to the LACP packet sent by the second node; then establishes a correspondence between the first link information and the second link information. The relay node forwards the LACP packet sent by the first node to the second node according to the correspondence, and forwards the LACP packet sent by the first node to the second node according to the correspondence.

18 Claims, 4 Drawing Sheets

(51) Int. Cl.
*H04L 12/24* (2006.01)
*H04L 12/803* (2013.01)

(56) References Cited

U.S. PATENT DOCUMENTS

| | | | |
|---|---|---|---|
| 8,122,127 B2* | 2/2012 | Bhatt | H04L 45/245 709/224 |
| 2002/0110148 A1* | 8/2002 | Hickman | H04L 45/00 370/475 |
| 2003/0061533 A1 | 3/2003 | Perloff et al. | |
| 2003/0128706 A1 | 7/2003 | Mark et al. | |
| 2009/0109998 A1 | 4/2009 | Vinayagam et al. | |
| 2010/0002656 A1* | 1/2010 | Ji | H04W 72/082 370/336 |
| 2010/0329147 A1 | 12/2010 | Nam et al. | |
| 2011/0211585 A1* | 9/2011 | Kodaka | H04L 45/00 370/401 |
| 2011/0292788 A1* | 12/2011 | Tsuchiya | H04L 12/4625 370/218 |
| 2012/0224526 A1* | 9/2012 | Sonobe | H04L 12/4625 370/315 |
| 2012/0246213 A1 | 9/2012 | Ma et al. | |
| 2014/0050092 A1 | 2/2014 | Fan | |

FOREIGN PATENT DOCUMENTS

| | | |
|---|---|---|
| CN | 102098211 A | 6/2011 |
| CN | 102239670 A | 11/2011 |
| CN | 102388581 A | 3/2012 |
| CN | 102404143 A | 4/2012 |
| CN | 102647355 A | 8/2012 |
| JP | 2012009996 A | 1/2012 |

OTHER PUBLICATIONS

Partial English Translation and Abstract of Chinese Patent Application No. CN102647355A, Sep. 24, 2014, 7 pages.
Partial English Translation and Abstract of Chinese Patent Application No. CN1553628A, Dec. 1, 2014, 5 pages.
Partial English Translation and Abstract of Chinese Patent Application No. CN102404143A, Dec. 1, 2014, 5 pages.
Foreign Communication From a Counterpart Application, Chinese Application No. 201210106745.7, Chinese Office Action dated Mar. 20, 2014, 10 pages.
Foreign Communication From a Counterpart Application, PCT Application No. PCT/CN2012/084270, English Translation of International Search Report dated Feb. 28, 2013, 2 pages.
Foreign Communication From a Counterpart Application, PCT Application No. PCT/CN2012/084270, English Translation of Written Opinion dated Feb. 28, 2013, 9 pages.

* cited by examiner

LACP NEGOTIATION PROCESSING METHOD, RELAY NODE, AND SYSTEM

CROSS-REFERENCE TO RELATED APPLICATIONS

This application is a continuation of International Application No. PCT/CN2012/084270, filed on Nov. 8, 2012, which claims priority to Chinese Patent Application No. 201210106745.7, filed on Apr. 12, 2012, both of which are incorporated herein by reference in their entireties.

TECHNICAL FIELD

The present invention relates to communications technologies, and in particular, to a Link Aggregation Control Protocol (LACP) negotiation processing method, relay node, and system.

BACKGROUND

The Link Aggregation Control Protocol (LACP) provides a port negotiation manner for devices that run the protocol to exchange data. After a link aggregation group is established between two devices based on the LACP, higher bandwidth and reliability are provided for communication between the two devices.

In the prior art, establishment and maintenance of a link aggregation group between two devices according to LACP negotiation are implemented through interactions of Link Aggregation Control Protocol Data Units (LACPDUs), that is, LACP packets. Further, after enabled with the LACP, a port of a device sends an LACP packet to a peer device to notify the peer device of information such as a system priority, a system media access control (MAC) address, a port priority, a port number, and an operation key of the device. After receiving the LACP packet, the peer device selects a port that can be aggregated according to the foregoing information in the LACP packet. After performing the foregoing operations, both devices may agree on whether a respective port is selected, thereby determining whether a link can be added to a link aggregation group.

In an actual application, however, to implement interconnections between long distance devices, usually a relay device needs to be employed to forward data, that is, an indirect connection scenario. Therefore, how to implement LACP negotiation between indirectly connected devices is an urgent problem to be solved.

SUMMARY

Embodiments of the present invention provide an LACP negotiation processing method, relay node, and system that are used to provide a method for effective LACP protocol negotiation between indirectly connected nodes.

To achieve the foregoing objective, a first aspect of the present invention provides an LACP negotiation processing method, including receiving, by a relay node, LACP packets; acquiring, by the relay node, first link information between the relay node and a first node according to an LACP packet sent by the first node, and acquiring second link information between the relay node and a second node according to an LACP packet sent by the second node; establishing, by the relay node, a correspondence between the first link information and the second link information; and forwarding, by the relay node according to the correspondence, to the second node, the LACP packet sent by the first node, and forwarding, to the first node according to the correspondence, the LACP packet sent by the second node over a link corresponding to the second link information.

A second aspect of the present invention provides a relay node, including a transceiver module configured to receive LACP packets; forward, to a second node according to a correspondence between first link information and second link information, an LACP packet sent by a first node over a link corresponding to the first link information, where the first link information is between the first node and the relay node, and the second link information is between the second node and the relay node; and forward, to the first node according to the correspondence, an LACP packet sent by the second node over a link corresponding to the second link information; an acquiring module configured to acquire the first link information between the relay node and the first node according to the LACP packet sent by the first node, and acquire the second link information between the relay node and the second node according to the LACP packet sent by the second node; and a processing module configured to establish the correspondence between the first link information and the second link information.

A third aspect of the present invention further provides an LACP negotiation processing system, including a first node, a second node, and a relay node according to the second aspect.

According to the foregoing technical solutions, in the embodiments of the present invention, a relay node acquires link information according to LACP packets sent by a first node and a second node; and establishes a correspondence between first link information and second link information, where the first link information is between the first node and the relay node, and the second link information is between the second node and the relay node. The correspondence can be used to implement establishing of a one-to-one LACP packet receiving-sending relationship between ports of indirectly connected nodes, which ensures effective LACP negotiation when a link aggregation group is established between the indirectly connected nodes.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
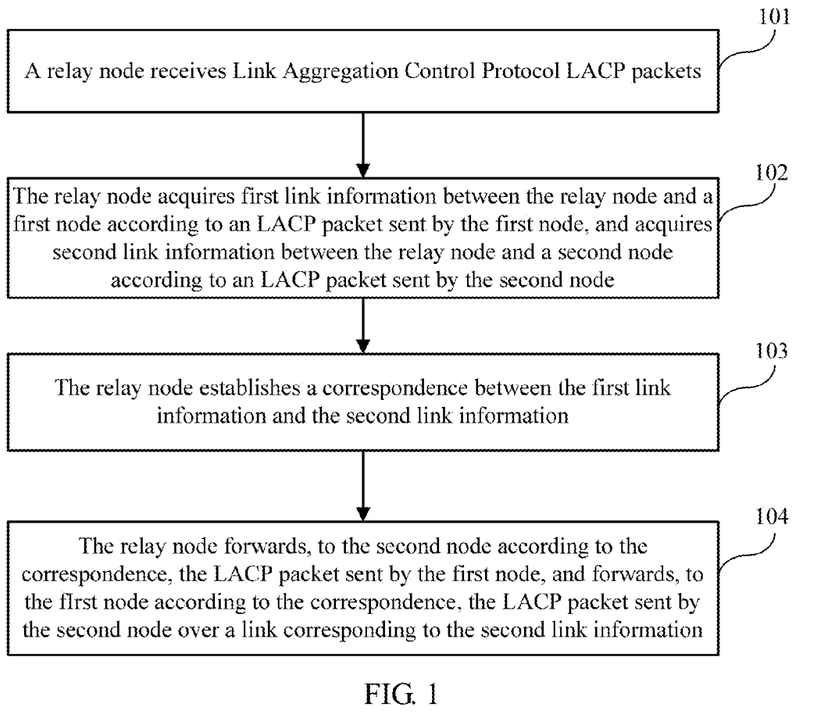
FIG. 1 is a flowchart of an embodiment of an LACP negotiation processing method according to the present invention.
Figure 2:
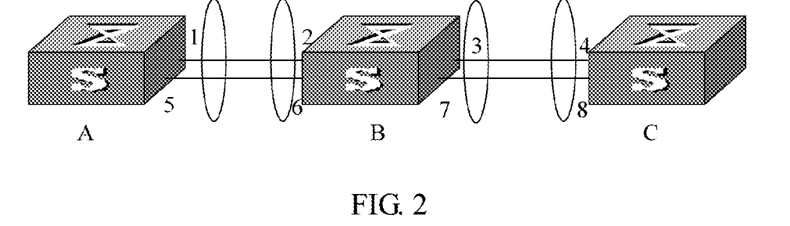
FIG. 2 is a schematic structural diagram of connections between nodes in FIG. 1.

FIG. 1 is a flowchart of an embodiment of an LACP negotiation processing method according to the present invention, and FIG. 2 is a schematic structural diagram of connections between nodes in FIG. 1. As shown in FIG. 1 and FIG. 2, the method in this embodiment includes the following steps.

Step 101: A relay node receives LACP packets.

In network communication, to implement interconnections between long distance devices, a relay node is usually employed to forward data. Establishing a link aggregation group between indirectly connected nodes can increase bandwidth of links between indirectly connected nodes and improve reliability of the links. As shown in FIG. 2, numbers 1 to 8 respectively indicate port numbers of physical ports of corresponding nodes, and four circles indicate link aggregation groups that are finally formed. When a link aggregation group is established between a first node A and a second node C that are indirectly connected, a port on the first node A first sends an LACP packet after enabling the LACP, so as to notify the second node C of a system priority, a system MAC address, a port priority, a port number, and an operation key of the first node A, where such information is usually carried in basic fields of an LACPDU. The LACP packet sent by the first node A is forwarded to the second node C using a relay node B. After receiving the LACP packet, the second node C compares information carried in the LACP packet with information that is about ports at a local end and stored on the second node C, so as to select ports that can be aggregated from the ports stored on the second node C. The ports at the local end that are stored in the second node are ports that are on the second node C and receive the LACP packet sent by the first node A, and information about a port at the local end is information about an end on which the second node locates, such as a system priority, a system MAC address, a port priority, a port number, and an operation key. After receiving the LACP packet, the second node C compares port information about the first node with port information about the ports on the second node C, so as to determine whether the second node C has a port that can be added to a link aggregation group and which port can be added to the link aggregation group. Likewise, a port on the second node C also sends an LACP packet, so as to notify the first node A of information of the second node C. After the relay node B forwards to the first node A the LACP packet sent by the second node C and the first node A receives the LACP packet, the first node A performs same processing, that is, the first node A selects ports that can be aggregated from ports on the first node A according to information carried in the packet, so that the first node A and the second node C may agree on whether a respective port is added to or removed from a dynamic link aggregation group, that is, the first node A and the second node C perform LACP negotiation by mutually receiving and sending LACP packets, so as to form a link aggregation group between indirectly connected devices. Likewise, when an aggregation condition changes, the link aggregation group can also be automatically adjusted or dissolved through LACP negotiation. During establishing or dissolving of the link aggregation group, for the first node A and the second node C, operations performed are still a negotiation process based on the LACP standard protocol.

In an actual application, a relay node may monitor all types of packets that the relay node receives. In this step, the relay node B monitors the LACP packets and performs corresponding processing, so that effective negotiation can be performed between indirectly connected nodes to establish a link aggregation group. Further, when an LACP packet sent by a node at one end arrives, the relay node acquires the LACP packet, performs corresponding processing according to port information carried in the LACP packet, and forwards the LACP packet to a node at the other end. For example, after receiving an LACP packet, a port on the relay node B reports the LACP packet to a central processing unit (CPU) of the relay node. The CPU parses the packet and performs subsequent processing according to a parsing result.

Step 102: The relay node acquires first link information between the relay node and a first node according to an LACP packet sent by the first node, and acquires second link information between the relay node and a second node according to an LACP packet sent by the second node.

Link information is information corresponding to a link between a first node and a relay node or between a second node and a relay node, and may include an actor port number of a port for sending a packet, a partner port number of a port for receiving a packet, a source MAC address of a source node that sends a packet, and the like.

Link information in this embodiment includes an actor port number of a port for sending an LACP packet, a partner port number of a port for receiving an LACP packet, and a source MAC address of a node that sends a packet. In this step, after receiving an LACP packet, the relay node B acquires a physical port that receives the LACP packet, determines a port number corresponding to the physical port, and acquires a source MAC address and an actor port number that are of the first node A and carried in the LACP packet, that is, acquires first link information between the first node and the relay node. Likewise, the relay node performs same processing after receiving an LACP packet sent by the second node C, that is, acquires second link information between the second node and the relay node. The following uses MAC1 to indicate the MAC address of the first node A and uses MAC2 to indicate the MAC address of the second node C.

Further, the relay node may divide the acquired link information into two groups according to source MAC addresses carried in LACP packets, one group is link information between the first node and the relay node and is stored in a first link information table; and the other group is link information between the second node and the relay node and is stored in a second link information table. In an actual application, a physical partner port of the relay node reports a received LACP packet to a CPU, and the CPU acquires a corresponding partner port number, parses the LACP packet, and acquires a source MAC address and an actor port number of a port that sends the LACP packet on a transmit end device, where the source MAC address and the actor port number are carried in the LACP packet. To facilitate storing of the link information, the acquired link information can be stored in a link information table in a triplet form. After receiving an LACP packet, the relay node acquires link information corresponding to a link over which the LACP packet is transmitted, and stores the link information as a triplet {a partner port number, a source MAC address, an actor port number}, where the source MAC address in the triplet is used to identify a source end device that sends the LACP packet and is further used to determine a link information table to which the triplet belongs, so that a correspondence is subsequently established between triplets that are located in two link information tables. For example, a triplet acquired according to the LACP packet sent by the first node is stored in the first link information table corresponding to MAC1, and a triplet acquired according to the LACP packet sent by the second node is stored in the second link information table corresponding to MAC2, and then, the relay node establishes a triplet correspondence between the triplet in the first link information table and the triplet in the second link information table. Further, a process of acquiring second link information by the relay node may be, after acquiring first link information, the relay node acquires link information of a link from the second link information table that stores link information between the second node and the relay node to serve as the second link information; or after acquiring first link information, the relay node waits and acquires link information between the second node and the relay node, and after acquiring the link information between the second node and the relay node, the relay node directly uses the link information as the second link information.

A process of acquiring first link information by the relay node may be, in a period of time, after acquiring all link information and storing the link information in a corresponding first link information table and a corresponding second link information table, the relay node selects, in sequence, a piece of link information from the first link information table to serve as the first link information, and then, acquires the second link information using the foregoing method. For example, the relay node stores, in the first link information table, an acquired triplet corresponding to link information between the first node and the relay node, and stores, in the second link information table, a triplet corresponding to link information between the second node and the relay node, and then, the relay node selects a piece of link information from the first link information table to serve as the first link information, and selects a piece of link information from the second link information table or waits and acquires a piece of link information to serve as the second link information, so as to establish a correspondence with the first link information.

In a specific application, if the relay node stores link information in the foregoing triplet form, after receiving an LACP packet sent by the first node, the relay node acquires a first triplet {2, MAC1, 1} according to a physical partner port that receives the LACP packet and the LACP packet, and after determining, according to MAC1, that the first triplet belongs to the first link information table, the relay node acquires a triplet from the second link information table to serve as a second triplet. For example, the second triplet may be {3, MAC2, 4} or {7, MAC2, 8}. A process of acquiring a second triplet by the relay node may be the relay node determines, according to a partner port number or an actor port number in the second link information table, in sequence, whether a correspondence exists between each triplet and a triplet in the first link information table; and when it is found that a triplet in the second link information table has no corresponding triplet, the triplet is used as the second triplet. For example, the relay node learns through determining that a correspondence exists between a triplet {3, MAC2, 4} in the second link information table and a triplet {6, MAC1, 5} in the first link information table, and then the relay node continues to determine a triplet {7, MAC2, 8}; if no correspondence is established between the triplet {7, MAC2, 8} and any triplet in the first link information table, the triplet is used as the second triplet. Then, the relay node can establish a correspondence between the acquired second triplet and the first triplet, and can also store the correspondence, so that when receiving an LACP packet sent by the first node or second node next time, the relay node can directly use the correspondence to forward the packet to a peer node.

Step 103: The relay node establishes a correspondence between the first link information and the second link information.

As described above, after acquiring the first link information and the second link information, the relay node establishes a correspondence between the first link information and the second link information, so that the relay node subsequently forwards, to the second node according to the correspondence, an LACP packet sent by the first node over a link corresponding to the first link information; and forwards, to the first node according to the correspondence, an LACP packet sent by the second node over a link corresponding to the second link information. After a correspondence is established between the foregoing link information, the relay node can store the correspondence, so that, subsequently the relay node directly uses the correspondence to forward LACP packets. Storage of a correspondence by the relay node may be the relay node sets a mutual correspondence identifier separately in triplets in a first link information table and a second link information table; or saves triplets for which a correspondence has been established to other storage units, and subsequently the relay node can directly search the storage units that store the triplets for the correspondence to acquire link information.

For the foregoing triplets in the first link information table and the second link information table, after establishing a correspondence, the relay node can delete a triplet for which a correspondence has been established from a corresponding link information table, so that there is no correspondence between any triplet in the first link information table and any triplet in the second link information table, and subsequently, when a correspondence is to be established for other triplets in the link information tables, any triplet can be directly selected, thereby avoiding a process of searching for a triplet for which no correspondence is established when a correspondence is established subsequently, and increasing efficiency of a negotiation processing process.

It can be learned from the foregoing description of triples that, a triplet in the first link information table is used to record a communications link between a port of the first node and a port of the relay node, and a triplet in the second link information table is used to record a communications link between a port of the second node and a port of the relay node. By establishing a correspondence between a triplet in the first link information table and a triplet in the second link information table, the relay node implements a correspondence between a port of the first node and a port of the second node. When a port of the first node initiates an LACP negotiation request, all LACP packets sent by the port can be received by a same port on the second node; likewise, an LACP packet sent by the port on the second node to the first node is also received by a same port on the first node, thereby ensuring effective LACP negotiation processing between indirectly connected devices.

Step 104: The relay node forwards, to the second node according to the correspondence, the LACP packet sent by the first node, and forwards, to the first node according to the correspondence, the LACP packet sent by the second node over a link corresponding to the second link information.

After establishing a correspondence between link information in the foregoing step 103, the relay node acquires the second link information according to the correspondence, and forwards, to the second node over a link corresponding to the second link information, the LACP packet sent by the first node and received by the relay node. Likewise, according to the established correspondence, the relay node forwards the LACP packet sent by the second node and received by the relay node, that is, the LACP packet sent by the second node over a link corresponding to the second link information, to the first node over a link corresponding to the first link information, so that the second node and the first node each determines local end ports that can be aggregated after receiving a peer end LACP packet, and therefore, the second node and the first node agree on whether a respective port can be added to a link aggregation group, and finally a link aggregation group is established between the first node and the second node.

In this embodiment, the relay node B can receive and forward LACP packets that are exchanged between the first node A and the second node C that are indirectly connected, so that a link aggregation group is established through negotiation between indirectly connected nodes. A first node, a second node, and a relay node may be switch devices on a communications network. On an actual long distance communications network, multiple relay devices may be deployed between devices at both ends that communicate with each other, and each relay device performs processing using the foregoing method of the embodiment, which can ensure establishing of a link aggregation group between the devices at both ends that perform long distance communication, thereby implementing long distance transmission of data packets.

In this embodiment, according to first link information and second link information, where a correspondence is established between the second link information and the first link information, the relay node can ensure that LACP packets between indirectly connected nodes are received and sent between one-to-one ports, thereby ensuring effective negotiation when a link aggregation group is established between the indirectly connected nodes. For example, when receiving an LACP packet sent by a port corresponding to an actor port number 1 of the first node A, the relay node establishes a correspondence between a first triplet {2, MAC1, 1} and a second triplet {7, MAC2, 8}, and forwards the LACP packet to the second node C through a port corresponding to a partner port number 7. According to the second triplet, a port corresponding to an actor port number 8 on the second node C receives the LACP packet. Likewise, when the port corresponding to the actor port number 8 sends an LACP packet to the first node A, according to the correspondence, the LACP packet is received by the port corresponding to the actor port number 1. Therefore, the foregoing method can ensure that LACP packets between indirectly connected nodes are received and sent between one-to-one ports, thereby ensuring that LACP negotiation is effectively performed between the indirectly connected nodes.

In this embodiment, a relay node acquires link information according to received LACP packets sent by a first node and a second node; and establishes a correspondence between first link information and second link information, where the first link is between the first node and the relay node, and the second link is between the second node and the relay node. The correspondence can be used to implement establishing of a one-to-one LACP packet receiving-sending relationship between ports of indirectly connected nodes, which ensures effective LACP negotiation when a link aggregation group is established between the indirectly connected nodes.

In an actual application, indirectly connected nodes can use the foregoing established link aggregation group to transmit data packets. In addition, configuring ports of the relay node as an Ethernet port aggregation group can implement load sharing when the data packets are forwarded.

Figure 3:
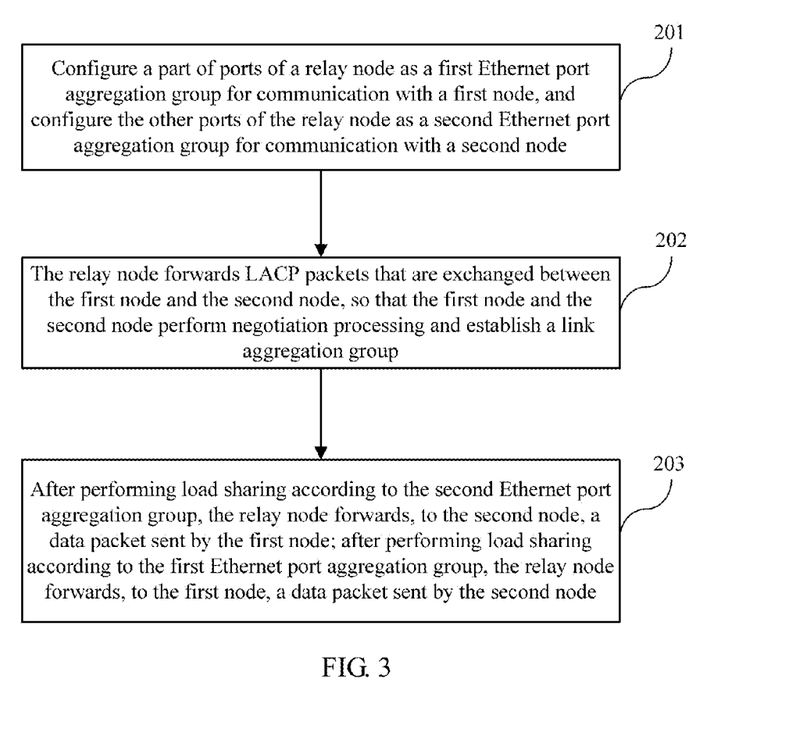
FIG. 3 is a flowchart of another embodiment of an LACP negotiation processing method according to the present invention.

FIG. 3 is a flowchart of another embodiment of an LACP negotiation processing method according to the present invention. As shown in FIG. 3, in this embodiment, a relay node forwards data packets after establishing a link aggregation group using the method shown in FIG. 1. The method in this embodiment includes the following steps.

Step 201: Configure a part of the ports of a relay node as a first Ethernet port aggregation group for communication with a first node, and configure the other ports of the relay node as a second Ethernet port aggregation group for communication with a second node.

When outgoing and incoming traffic needs to be shared between multiple Ethernet ports, a switch device can configure Ethernet port aggregation group (Eth-trunk) ports. In this embodiment, the relay node configures a part of its ports as Eth-trunk1 and configures the other ports as Eth-trunk2. As shown in FIG. 2, two physical ports whose port numbers are 2 and 6 respectively are configured as Eth-trunk1, and the two ports are respectively connected to two ports of the first node; and two physical ports whose port numbers are 3 and 7 respectively are configured as Eth-trunk2, and the two ports are respectively connected to two ports of the second node. After an Eth-trunk is configured, the relay node can perform, between ports of the Eth-trunk, load sharing on data packets to be forwarded by the relay node.

Step 202: The relay node forwards LACP packets that are exchanged between the first node and the second node, so that the first node and the second node perform negotiation processing and establish a link aggregation group.

The relay node forwards, using the foregoing negotiation processing method shown in FIG. 1, LACP packets that are exchanged between the first node and the second node, so that a link aggregation group for transmitting user data packets is established between the first node and the second node that are indirectly connected. According to the established link aggregation group and a configured Ethernet port aggregation group, the relay node can perform effective load sharing on data packets to be forwarded by the relay node.

Step 203: After performing load sharing according to the second Ethernet port aggregation group, the relay node forwards, to the second node, a data packet sent by the first node; after performing load sharing according to the first Ethernet port aggregation group, the relay node forwards, to the first node, a data packet sent by the second node.

Further, the relay node can determine whether a received packet is an LACP packet or a user data packet according to a packet attribute such as a content feature of a specific field of the packet; for example, a destination MAC is a multicast address 0x01-80-c2-00-00-02, a Layer 2 protocol type field is 0x8809, or a protocol subtype is 0x01.

When packets received and sent by the relay node are LACPDUs at a protocol interaction level, the relay node can establish a one-to-one port correspondence for receiving and sending LACPDUs between the first node and the second node, which ensures that LACPDUs exchanged between indirectly connected nodes are received and sent between one-to-one ports, thereby ensuring effective LACP negotiation between the indirectly connected nodes to establish a link aggregation group. When packets received and sent by the relay node are user service data packets, with a configured Eth-trunk, load sharing can also be effectively performed to forward the user service data packets in the established link aggregation group.

As shown in FIG. 2, data received and sent by the first node A is transmitted between ports of the first Ethernet port aggregation group Eth-trunk1, and data received and sent by the second node C is transmitted between ports of the second Ethernet port aggregation group Eth-trunk2. Therefore, when two indirectly connected devices need to transmit data over a longer distance, the two indirectly connected devices can use multiple relay switches between them to establish a link aggregation group using the foregoing negotiation method, where the link aggregation group is equivalent to a serially connected link aggregation group, and therefore, transmission of user data between long distance devices can be completed.

In this embodiment, based on LACP negotiation processing and establishing of a link aggregation group in the foregoing embodiment, further, by configuring its ports as two Ethernet port aggregation groups, the relay node can implement load sharing in the established link aggregation group according to an Ethernet port aggregation group when forwarding data packets. Therefore, in view of a protocol plane, the method of this embodiment can ensure effective one-to-one negotiation for LACP packets between indirectly connected nodes, and in view of a data forwarding plane, the method of this embodiment can ensure effective load sharing for data packets on links. Two Eth-trunks are configured on each relay node and are respectively connected to nodes at both ends. A link aggregation group for a longer distance can be established using the method of this embodiment, thereby implementing long distance data transmission.

Figure 4:
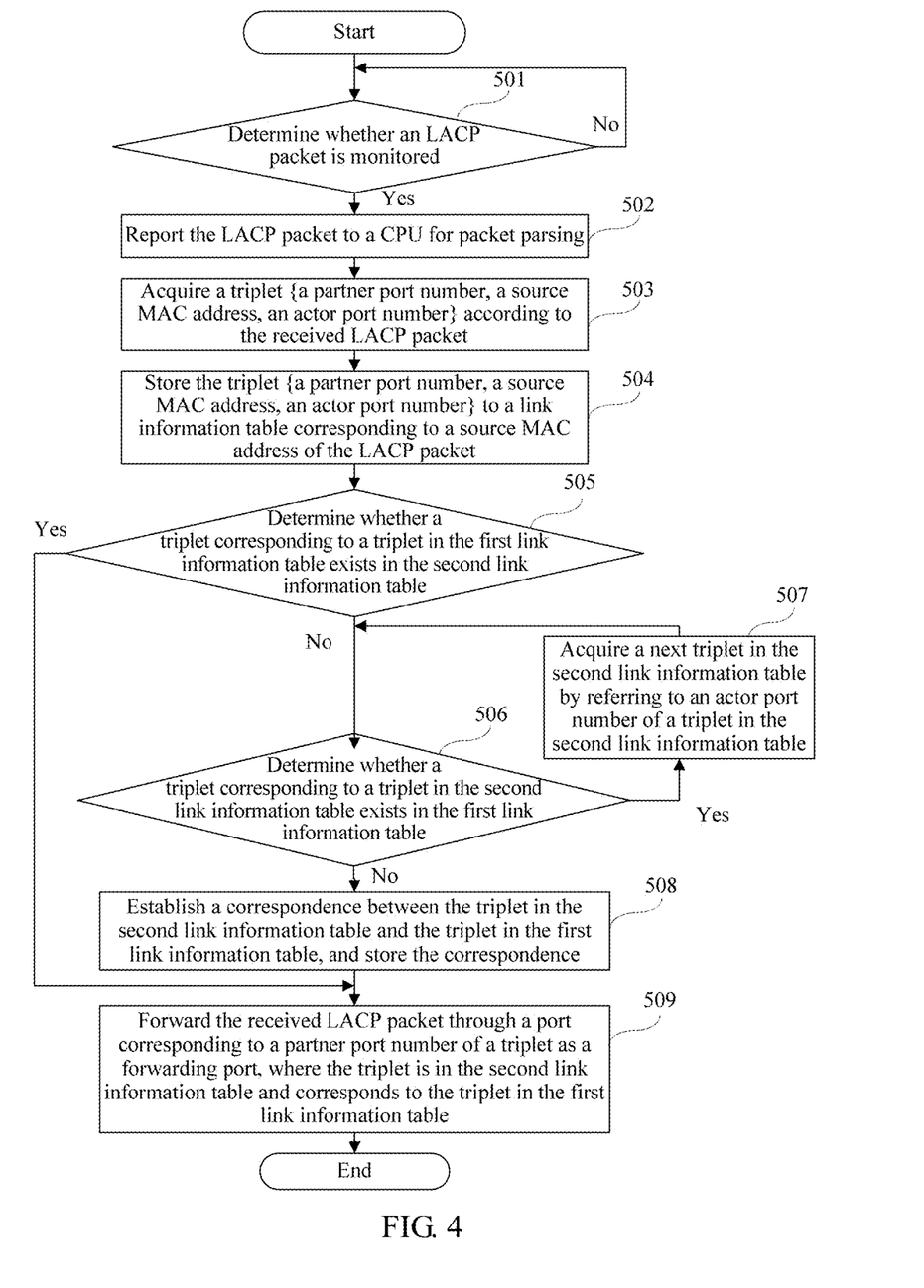
FIG. 4 is a detailed flowchart of LACP packet forwarding of a relay node according to an embodiment of the present invention.

FIG. 4 is a detailed flowchart of LACP packet forwarding of a relay node according to an embodiment of the present invention. The following describes in detail the embodiment shown in FIG. 1 with reference to FIG. 4. In this embodiment of the present invention, operations performed by a relay node when it is running include the following steps.

Step 501: Determine whether an LACP packet is monitored; if an LACP packet is monitored, perform step 502; otherwise, continue to monitor an LACP packet.

Step 502: Report the LACP packet to a CPU for packet parsing.

Step 503: Acquire a triplet {a partner port number, a source MAC address, an actor port number} according to the received LACP packet.

Step 504: Store the triplet {a partner port number, a source MAC address, an actor port number} to a link information table corresponding to a source MAC address of the LACP packet, that is, store the triplet acquired in step 503 accordingly to a first link information table or a second link information table.

Step 505: Determine whether a triplet corresponding to a triplet in the first link information table exists in the second link information table; if a triplet corresponding to a triplet in the first link information table exists in the second link information table, perform step 509; otherwise, perform step 506.

Step 506: Determine whether a triplet corresponding to a triplet in the second link information table exists in the first link information table; if no triplet corresponding to a triplet in the second link information table exists in the first link information table, perform step 508; otherwise, perform step 507.

Step 507: Acquire a next triplet in the second link information table by referring to an actor port number of a triplet in the second link information table, and continue to perform step 506.

Step 508: Establish a correspondence between the triplet in the second link information table and the triplet in the first link information table, and store the correspondence.

Step 509: Forward the received LACP packet through a port corresponding to a partner port number of a triplet as a forwarding port, where the triplet is in the second link information table and corresponds to the triplet in the first link information table.

In a networking scenario in which an LACP-based link aggregation group is established on indirectly connected devices, a relay device performs the foregoing operations, so that a one-to-one correspondence can be established for ports that are on devices of both sides and enabled with the LACP protocol, and LACP packets can be forwarded effectively according to the correspondence, thereby implementing establishing of the LACP-based link aggregation group between the indirectly connected devices, so as to transmit a user data service.

Figure 5:
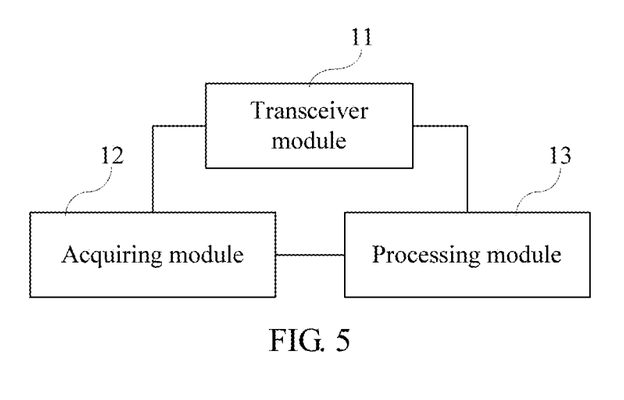
FIG. 5 is a schematic structural diagram of an embodiment of a relay node according to the present invention.

FIG. 5 is a schematic structural diagram of an embodiment of a relay node according to the present invention. As shown in FIG. 5, the relay node in this embodiment includes a transceiver module 11, an acquiring module 12, and a processing module 13. The transceiver module 11 is configured to receive LACP packets sent by a first node and a second node; forward, to the second node according to a correspondence between first link information and second link information, an LACP packet sent by the first node over a link corresponding to the first link information, where the first link information is between the first node and the relay node, and the second link information is between the second node and the relay node; and send, to the first node according to the correspondence, an LACP packet sent by the second node over a link corresponding to the second link information, so that the second node performs negotiation with the first node so as to establish a link aggregation group between the first node and the second node. The acquiring module 12 is configured to acquire the first link information between the relay node and the first node according to the LACP packet sent by the first node, and acquire the second link information between the relay node and the second node according to the LACP packet sent by the second node. The processing module 13 is configured to establish the correspondence between the first link information and the second link information.

In this embodiment, after receiving an LACP packet sent by a node at an indirectly connected end, the transceiver module 11 in the relay node uploads the LACP packet to the acquiring module 12; the acquiring module 12 acquires first link information according to the LACP packet, where the first link information corresponds to a link between the node at the end and the relay node, and selects a piece of link information from link information between a node at the other end and the relay node to serve as second link information; the processing module 13 establishes a correspondence between the acquired second link information and the acquired first link information; and the transceiver module 11 forwards the LACP packet to the node at the peer end according to the correspondence. A port corresponds to a unique piece of link information, and link information of two links are in a one-to-one correspondence, so that LACP packets can be effectively exchanged between two nodes at indirectly connected ends to complete LACP negotiation processing and establish a link aggregation group. Therefore, subsequently a user data service can be transmitted in the established link aggregation group.

The relay node in this embodiment can be used to execute the foregoing method in the embodiment shown in FIG. 1. An operating principle and a technical effect of the relay node are similar to those of the method embodiments, and specific details are not described herein again.

Figure 6:
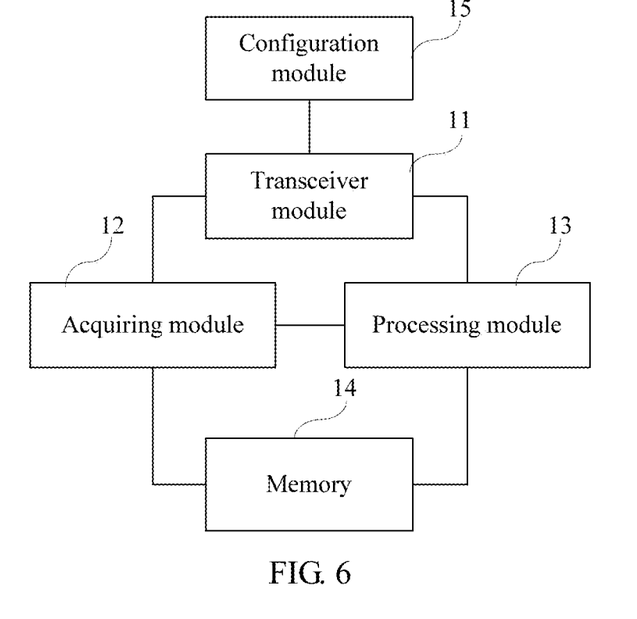
FIG. 6 is a schematic structural diagram of another embodiment of a relay node according to the present invention.

FIG. 6 is a schematic structural diagram of another embodiment of a relay node according to the present invention. As shown in FIG. 6, based on the foregoing embodiment shown in FIG. 5, the relay node in this embodiment further includes a memory 14 configured to store link information between a first node and a relay node and link information between a second node and the relay node. When acquiring the second link information, the acquiring module 12 can acquire a piece of link information for which no correspondence is established from the information that is about a link between the relay node and the first node and stored in the memory 14 to serve as the second link information, where a correspondence is established between the first link information and the second link information. A process of acquiring the second link information by the acquiring module 12 may be, according to a partner port number or an actor port number in link information, selecting a piece of link information for which no correspondence is established from multiple pieces of link information between the second node and the relay node to serve as the second link information.

Further, when the transceiver module 11 receives an LACP packet from a node at an end, the acquiring module 12 acquires link information of a link over which the LACP packet is transmitted; the memory 14 stores the link information to a corresponding link information table according to a source MAC address used for sending the LACP packet; and then, the acquiring module 12 acquires first link information and second link information respectively from two link information tables, where a correspondence is to be established for the first link information and the second link information; and the processing module 13 establishes a one-to-one correspondence between the first link information and the second link information. The memory 14 can further store the established one-to-one correspondence, and therefore, subsequently when receiving an LACP packet sent by a corresponding port of the node at the end, the transceiver module 11 can forward the LACP packet to a corresponding port of a node at a peer end according to the correspondence. Therefore, the nodes at both ends each can determine which ports can be added to a link aggregation group according to the received LACP packet of the node at the peer end and port information about the local end.

After a link aggregation group is established, the nodes at both ends can use the established link aggregation group to perform load sharing to transmit user data packets between ports of the aggregation group. In this embodiment of the present invention, the relay node may further include a configuration module 15, which is configured to configure some ports of the relay node as a first Ethernet port aggregation group for communication with the first node, and configure the other ports of the relay node as a second Ethernet port aggregation group for communication with the second node. When indirectly connected nodes transmit user data packets, the transceiver module 11 of the relay node cooperates, according to Eth-trunk ports configured by the configuration module 15, with the established link aggregation group to implement load sharing for data packets in the link aggregation group.

In an actual application, as described in the foregoing method embodiment, link information is stored in a triplet form. A memory stores, to a first link information table, a triplet that is acquired according to an LACP packet sent by a first node, and stores, to a second link information table, a triplet that is acquired according to an LACP packet sent by a second node; an acquiring module acquires a first triplet and a second triplet for which a one-to-one correspondence is to be established; a processing module establishes, according to the first triplet and the second triplet acquired by the acquiring module, correspondences between triplets in the first link information table and triplets in the second link information table one by one, so as to implement that LACP packets sent by the first node and the second node are received and sent between one-to-one ports, thereby implementing interaction and negotiation for the first node and the second node that are indirectly connected to establish a link aggregation group. According to a configured Eth-trunk, a transceiver module can perform load sharing on data packets that are sent by a node at an end and received by the transceiver module, and then forward the data packets to a node at a peer end.

This embodiment can be used to execute the foregoing method in the embodiment shown in FIG. 3. An operating principle and a technical effect of this embodiment are similar to those of the method embodiment, which are not described herein again.

An embodiment of the present invention further provides an LACP negotiation processing system, including a first node, a second node, and a relay node as shown in FIG. 5 or FIG. 6, where the relay node is configured to forward LACP packets and data packets transmitted between the first node and the second node.

The LACP negotiation processing system in this embodiment can be used to execute the method in any one of the foregoing embodiments. An operating principle and a technical effect of the LACP negotiation processing system are similar to those of the method embodiment, which are not described herein again.

Persons of ordinary skill in the art may understand that all or a part of the steps of the method embodiments may be implemented by relevant hardware instructed by a program. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the above embodiments are used to describe the technical solutions of the present invention without imposing any limitation thereon. Although the present invention is described in detail by referring to the exemplary embodiments, persons of ordinary skill in the art should understand that various modifications or equivalent replacements can be made to the technical solutions of the present invention without departing from the principle and scope of the present invention.

What is claimed is:

1. A Link Aggregation Control Protocol (LACP) negotiation processing method comprising:
  receiving, by a relay node, LACP packets;
  acquiring, by the relay node, first link information between the relay node and a first node according to an LACP packet sent by the first node;

acquiring second link information between the relay node and a second node according to an LACP packet sent by the second node;

establishing, by the relay node, a correspondence between the first link information and the second link information;

forwarding to the second node, by the relay node and according to the correspondence, the LACP packet sent by the first node over a link corresponding to the first link information; and forwarding, to the first node according to the correspondence, the LACP packet sent by the second node over a link corresponding to the second link information.

2. The method according to claim 1, wherein acquiring, by the relay node, second link information between the relay node and the second node according to the LACP packet sent by the second node comprises:

acquiring, by the relay node, multiple pieces of link information between the relay node and the second node according to LACP packets sent by different ports of the second node;

storing, by the relay node, the multiple pieces of link information between the relay node and the second node; and acquiring, by the relay node, a piece of link information for which no correspondence is established from the stored multiple pieces of link information between the relay node and the second node to serve as the second link information.

3. The method according to claim 2, wherein each piece of link information comprises an actor port number, a partner port number, and a source media access control (MAC) address of an LACP packet, wherein acquiring, by the relay node, first link information between the relay node and the first node according to the LACP packet sent by the first node comprises:

acquiring, by the relay node, a source MAC address and an actor port number that re of the first node and carried in the LACP packet sent by the first node; and determining a partner port number of a port that receives the LACP packet sent by the first node, and wherein acquiring, by the relay node, multiple pieces of link information between the relay node and the second node according to the LACP packets sent by different ports of the second node comprises:

acquiring for each LACP packet, by the relay node, a source MAC address of the second node and an actor port number of a port that sends the LACP packet on the second node, wherein the source MAC address and the actor port number are carried in the LACP packet sent by the second node; and determining a partner port number of a port that receives the LACP packet sent by the second node.

4. The method according to claim 3, wherein acquiring, by the relay node, the piece of link information for which no correspondence is established from the stored multiple pieces of link information between the relay node and the second node to serve as the second link information comprises acquiring, by the relay node, according to a partner port number or an actor port number of link information, a piece of link information for which no correspondence is established from the stored multiple pieces of link information between the relay node and the second node to serve as the second link information.

5. The method according to claim 1, wherein a portion of the ports of the relay node are configured as a first Ethernet port aggregation group for communication with the first node, wherein the other ports of the relay node are configured as a second Ethernet port aggregation group for communication with the second node, and wherein the method further comprises:

forwarding, by the relay node, after performing load sharing according to the second Ethernet port aggregation group, to the second node, a data packet sent by the first node; and forwarding, by the relay node, after performing load sharing according to the first Ethernet port aggregation group, to the first node, a data packet sent by the second node.

6. The method according to claim 4, wherein a part of the ports of the relay node are configured as a first Ethernet port aggregation group for communication with the first node, wherein the other ports of the relay node are configured as a second Ethernet port aggregation group for communication with the second node, and wherein the method further comprises:

forwarding, by the relay node, after performing load sharing according to the second Ethernet port aggregation group, to the second node, a data packet sent by the first node; and forwarding, by the relay node, after performing load sharing according to the first Ethernet port aggregation group, to the first node, a data packet sent by the second node.

7. A relay node comprising:

a network interface configured to:
  receive Link Aggregation Control Protocol (LACP) packets;
  forward, to a second node according to a correspondence between first link information and second link information, an LACP packet sent by a first node over a link corresponding to the first link information, wherein the first link information is between the first node and the relay node, and wherein the second link information is between the second node and the relay node; and
  forward, to the first node according to the correspondence, an LACP packet sent by the second node over a link corresponding to the second link information;

a memory configured to store instructions; and a processor coupled to the network interface and the memory, wherein the processor is configured to execute the instructions stored in the memory to:
  acquire the first link information between the relay node and the first node according to the LACP packet sent by the first node;
  acquire the second link information between the relay node and the second node according to the LACP packet sent by the second node; and
  establish the correspondence between the first link information and the second link information.

8. The relay node according to claim 7, wherein the memory is further configured to store link information between the first node and the relay node and link information between the second node and the relay node, and wherein the processor is configured to acquire, after acquiring the first link information between the relay node and the first node according to the LACP packet sent by the first node, a piece of link information for which no correspondence is established from the multiple pieces of link information that are stored in the memory between the relay node and the second node to serve as the second link information.

9. The relay node according to claim 8, wherein each piece of the link information comprises an actor port number, a partner port number, and a source media access control (MAC) address of an LACP packet, and wherein the processor is further configured to:
  acquire a source MAC address and an actor port number that are of the first node and carried in the LACP packet sent by the first node;
  determine a partner port number of a port that receives the LACP packet sent by the first node;
  acquire a source MAC address and an actor port number that are of the second node and carried in the LACP packet sent by the second node; and
  determine a partner port number of a port that receives the LACP packet sent by the second node.

10. The relay node according to claim 9, wherein the processor is further configured to select, after acquiring the first link information between the relay node and the first node according to the LACP packet sent by the first node, and according to a partner port number or an actor port number in the first link information, a piece of link information for which no correspondence is established from the multiple pieces of link information between the second node and the relay node to serve as the second link information.

11. The relay node according to claim 10, wherein the processor is further configured to:
  configure a part of the ports of the relay node as a first Ethernet port aggregation group for communication with the first node;
  configure the other ports of the relay node as a second Ethernet port aggregation group for communication with the second node, and
  wherein the network interface is further configured to:
    forward, to the first node, a data packet sent by the second node after performing load sharing according to the first Ethernet port aggregation group; and
    forward, to the second node, a data packet sent by the first node after performing load sharing according to the second Ethernet port aggregation group.

12. The relay node according to claim 7, wherein the processor is further configured to:
  configure a part of the ports of the relay node as a first Ethernet port aggregation group for communication with the first node;
  configure the other ports of the relay node as a second Ethernet port aggregation group for communication with the second node, and
  wherein the network interface is further configured to:
    forward, to the first node, a data packet sent by the second node after performing load sharing according to the first Ethernet port aggregation group; and
    forward, to the second node, a data packet sent by the first node after performing load sharing according to the second Ethernet port aggregation group.

13. A Link Aggregation Control Protocol (LACP) negotiation processing system comprising:
  a first node;
  a second node; and
  a relay node, wherein each of the first node and the second node is configured to send an LACP packet to the relay node, and wherein the relay node is configured to:
    receive the LACP packets sent by the first node and the second node;
    acquire first link information between the relay node and the first node according to the LACP packet sent by the first node;
    acquire second link information between the relay node and the second node according to the LACP packet sent by the second node;
    establish correspondence between the first link information and the second link information;
    forward, according to the correspondence, the LACP packet sent by the first node over a link corresponding to the first link information to the second node; and
    forward, according to the correspondence, the LACP packet sent by the second node over a link corresponding to the second link information to the first node.

14. The system according to claim 13, wherein when acquiring second link information between the relay node and the second node according to the LACP packet sent by the second node, the relay node is configured to:
  acquire multiple pieces of link information between the relay node and the second node according to LACP packets sent by different ports of the second node;
  store the multiple pieces of link information between the relay node and the second node; and
  acquire a piece of link information for which no correspondence is established from the stored multiple pieces of link information between the relay node and the second node to serve as the second link information.

15. The system according to claim 14, wherein each piece of link information comprises an actor port number, a partner port number, and a source media access control (MAC) address of an LACP packet, wherein when acquiring first link information between the relay node and the first node according to the LACP packet sent by the first node, the relay node is configured to:
  acquire a source MAC address and an actor port number that are of the first node and carried in the LACP packet sent by the first node; and
  determine a partner port number of a port that receives the LACP packet sent by the first node, and
  wherein when acquiring multiple pieces of link information between the relay node and the second node according to LACP packets sent by different ports of the second node, the relay node is configured to:
    acquire, for each LACP packet, a source MAC address of the second node and an actor port number of a port that sends the LACP packet on the second node, wherein the source MAC address and the actor port number are carried in the LACP packet sent by the second node; and
    determine a partner port number of a port that receives the LACP packet sent by the second node.

16. The system according to claim 15, wherein when acquiring a piece of link information for which no correspondence is established from the stored multiple pieces of link information between the relay node and the second node to serve as the second link information, the relay node is configured to acquire, according to a partner port number or an actor port number of link information, a piece of link information for which no correspondence is established from the stored multiple pieces of link information between the relay node and the second node to serve as the second link information.

17. The system according to claim 13, wherein a part of the ports of the relay node are configured as a first Ethernet port aggregation group for communication with the first node, wherein the other ports of the relay node are configured as a second Ethernet port aggregation group for communication with the second node, and wherein the relay node is further configured to:

forward, after performing load sharing according to the second Ethernet port aggregation group, to the second node, a data packet sent by the first node; and forward, after performing load sharing according to the first Ethernet port aggregation group, to the first node, a data packet sent by the second node.

18. The system according to claim 16, wherein a part of the ports of the relay node are configured as a first Ethernet port aggregation group for communication with the first node, wherein the other ports of the relay node are configured as a second Ethernet port aggregation group for communication with the second node, and wherein the relay node is further configured to:

forward, after performing load sharing according to the second Ethernet port aggregation group, to the second node, a data packet sent by the first node; and forward, after performing load sharing according to the first Ethernet port aggregation group, to the first node, a data packet sent by the second node.

* * * * *

UNITED STATES PATENT AND TRADEMARK OFFICE
CERTIFICATE OF CORRECTION

PATENT NO. : 9,461,928 B2  
APPLICATION NO. : 14/489754  
DATED : October 4, 2016  
INVENTOR(S) : Zhang et al.

Page 1 of 1

It is certified that error appears in the above-identified patent and that said Letters Patent is hereby corrected as shown below:

In the Claims

Column 13; Line 38, claim 3 should read:

The method according to claim 2, wherein each piece of link information comprises an actor port number, a partner port number, and a source media access control (MAC) address of an LACP packet, wherein acquiring, by the relay node, first link information between the relay node and the first node according to the LACP packet sent by the first node comprises:
 acquiring, by the relay node, a source MAC address and an actor port number that are of the first node and carried in the LACP packet sent by the first node; and
 determining a partner port number of a port that receives the LACP packet sent by the first node, and
 wherein acquiring, by the relay node, multiple pieces of link information between the relay node and the second node according to the LACP packets sent by different ports of the second node comprises:
 acquiring for each LACP packet, by the relay node, a source MAC address of the second node and an actor port number of a port that sends the LACP packet on the second node, wherein the source MAC address and the actor port number are carried in the LACP packet sent by the second node; and
 determining a partner port number of a port that receives the LACP packet sent by the second node.

Signed and Sealed this
Sixth Day of December, 2016

Michelle K. Lee
*Director of the United States Patent and Trademark Office*